United States Patent
Alewine et al.

(10) Patent No.: US 9,056,248 B2
(45) Date of Patent: Jun. 16, 2015

(54) SYSTEM AND METHOD FOR DETECTING INAPPROPRIATE CONTENT IN VIRTUAL WORLDS

(75) Inventors: Neal J. Alewine, Lake Worth, FL (US); Rick A. Hamilton, II, Charlottesville, VA (US); Robert A. Hood, Boca Raton, FL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 12/326,228

(22) Filed: Dec. 2, 2008

(65) Prior Publication Data
US 2010/0138455 A1 Jun. 3, 2010

(51) Int. Cl.
*G06F 17/00* (2006.01)
*A63F 13/30* (2014.01)
*G07F 17/32* (2006.01)
*G06F 17/30* (2006.01)

(52) U.S. Cl.
CPC ............. *A63F 13/12* (2013.01); *G07F 17/3281* (2013.01); *G06F 17/30867* (2013.01); *A63F 2300/535* (2013.01); *A63F 2300/5586* (2013.01)

(58) Field of Classification Search
CPC .................... G06F 17/30029; G06F 17/30699; G06F 17/30867; G06F 17/30038
USPC .......................................................... 707/803
See application file for complete search history.

(56) References Cited

U.S. PATENT DOCUMENTS

| 7,065,553 B1* | 6/2006 | Chesley et al. ............... 709/205 |
| 2001/0033297 A1 | 10/2001 | Shastri et al. |
| 2004/0172255 A1* | 9/2004 | Aoki et al. ..................... 704/275 |
| 2005/0131924 A1* | 6/2005 | Jones ............................ 707/100 |
| 2005/0179685 A1* | 8/2005 | Kake et al. ..................... 345/419 |
| 2006/0135232 A1 | 6/2006 | Willis |
| 2006/0135234 A1 | 6/2006 | Godse et al. |
| 2006/0135235 A1 | 6/2006 | Willis et al. |
| 2007/0013691 A1* | 1/2007 | Jung et al. ..................... 345/419 |
| 2007/0013692 A1* | 1/2007 | Jung et al. ..................... 345/419 |
| 2007/0024613 A1* | 2/2007 | Jung et al. ..................... 345/419 |
| 2007/0035548 A1* | 2/2007 | Jung et al. ..................... 345/474 |
| 2007/0118420 A1* | 5/2007 | Jung et al. ....................... 705/10 |
| 2007/0120981 A1* | 5/2007 | Levien et al. .............. 348/207.1 |

(Continued)

*Primary Examiner* — Christyann Pulliam
*Assistant Examiner* — Sheryl Holland
(74) *Attorney, Agent, or Firm* — William E. Schiesser; Keohane & D'Alessandro PLLC; Hunter E. Webb (57) ABSTRACT

A system for detecting inappropriate content in a virtual world environment has and a corresponding method utilizes a rating unit for rating each of one or more virtual objects based upon its content. The system has and the method utilizes a tagging unit for tagging each of the one or more virtual objects with its respective rating, an object tagging database for storing ratings of the one or more virtual objects, and a policy database for storing policies associated with the ratings and the regions. Further the system has and the method utilizes an object monitor for monitoring the movement of each of the one or more virtual objects, a security scanner for scanning each of the one or more virtual objects to determine the rating of each of the one or more virtual objects, and an enforcement module to enforce the policies of the policy database based upon the rating and the respective region.

20 Claims, 8 Drawing Sheets

(56) References Cited

U.S. PATENT DOCUMENTS

| | | | |
|---|---|---|---|
| 2007/0124239 A1* | 5/2007 | Jung et al. | 705/38 |
| 2007/0130001 A1* | 6/2007 | Jung et al. | 705/14 |
| 2007/0183430 A1* | 8/2007 | Asmussen | 370/395.51 |
| 2008/0207327 A1* | 8/2008 | Van Luchene et al. | 463/42 |
| 2008/0209577 A1 | 8/2008 | Vrielink et al. | |
| 2009/0132416 A1* | 5/2009 | Titus et al. | 705/44 |
| 2009/0216546 A1* | 8/2009 | Huang et al. | 705/1 |
| 2010/0081508 A1* | 4/2010 | Bhogal et al. | 463/40 |

* cited by examiner

Virtual World Object Tagging with Object Rating

Tag Number = SID-LOCATION-RV-OR-ITEM-DETAIL

| Seller ID | Location | Real/Virtual | Object Rating | Item | Details |
|---|---|---|---|---|---|
| 009 = IBM | TH001043 | R | General | 1951A31 = Laptop | T604437919B = Black T60 with specific options |
| 010 = SL | SL050799 | V | Teen | 44717 = mp3 player | 88144 = SL compatible mp3 with classic rock |
| 319 = AV | SL191802 | V | Adult | 96522 = arm tattoo | 96414 = Venus arm tattoo |

SYSTEM AND METHOD FOR DETECTING INAPPROPRIATE CONTENT IN VIRTUAL WORLDS

FIELD OF THE INVENTION

Aspects of the present invention provide a system and method for detecting inappropriate content in virtual worlds. An embodiment of the present invention identifies objects and content that are inappropriate in a virtual world, in a specific region within a virtual world, or in any given area within a virtual region such as at a beach or in a building.

BACKGROUND OF THE INVENTION

With the growing popularity of virtual worlds and the influx of new residents of all ages and dispositions, it is important to have controls in place so as not to expose inappropriate or offensive content to juveniles or to adults who do not wish to view such content. Virtual worlds may have regions and areas that are specifically designed for adults who are interested in a variety of mature subject matters. In such regions, it is possible for an avatar to purchase content and objects that are only suitable for interested adults, and that should not be taken into neutral or family-friendly regions and areas. Such items include objects that may be morally offensive such as items of a prurient nature or those that depict gang association and the like. Some may be audibly offensive such as music with explicit lyrics, while others may be visually offensive such as inappropriate clothing, appearance, gestures, and actions. There is a need for a system and method to identify such items and prohibit the carrying or using of such items outside of specific areas and regions, such as mature areas and regions.

SUMMARY OF THE INVENTION

In general, aspects of the present invention provide a system and a method for identifying and controlling mature and otherwise inappropriate content and objects in a virtual world, and more particularly, in regions or areas of a virtual world where such content is not permitted.

One embodiment of the present invention is a method for identifying virtual objects having inappropriate content in a virtual universe (VU) having one or more regions, the VU having one or more virtual objects, each of the one or more virtual objects having content, the method comprising rating each virtual object based upon its content, tagging each virtual object with its rating, storing each virtual object rating in an object tagging database, storing policies associated with the ratings and the regions in a policy database, monitoring the movement of each virtual object, scanning each virtual object to determine the rating of each virtual object, and enforcing the policies of the policy database based upon the rating of each virtual object and its respective region.

Another embodiment may be a system for identifying virtual objects having inappropriate content in a virtual universe (VU), the VU having one or more virtual objects, the VU further having one or more regions, the system comprising a rating unit for rating each of the one or more virtual objects based upon its content, a tagging unit for tagging each of the one or more virtual objects with its respective rating, an object tagging database for storing ratings of the one or more virtual objects, a policy database for storing policies associated with the ratings and the regions, an object monitor for monitoring the movement of each of the one or more virtual objects, a security scanner for scanning each of the one or more virtual objects to determine the rating of each of the one or more virtual objects, and an enforcement module to enforce the policies of the policy database based upon the rating of each virtual object and its respective region.

In another embodiment, the present invention provides a computer program product embodied in a computer readable medium for operating in a system comprising a processing unit, a memory, a bus, and one or more input/output (I/O) interfaces, for implementing a method for identifying virtual objects having inappropriate content in a virtual universe (VU) having one or more regions, the VU having one or more virtual objects, each of the one or more virtual objects having content, the method comprising rating each virtual object based upon its content, tagging each virtual object with its rating, storing each virtual object rating in an object tagging database, storing policies associated with the ratings and the regions in a policy database, monitoring the movement of each virtual object, scanning each virtual object to determine the rating of each virtual object and enforcing the policies of the policy database based upon the rating of each virtual object and its respective region.

Another embodiment embodies a method for deploying a computing infrastructure, comprising integrating computer-readable code into a computing system, wherein the code in combination with the computing system is capable of performing a process for identifying virtual objects having inappropriate content in a virtual universe (VU) having one or more regions, the VU having one or more virtual objects, each of the one or more virtual objects having content, process comprising rating each virtual object based upon its content, tagging each virtual object with its rating, storing each virtual object rating in an object tagging database, storing policies associated with the ratings and the regions in a policy database, monitoring the movement of each virtual object, scanning each virtual object to determine the rating of each virtual object, and enforcing the policies of the policy database based upon the rating of each virtual object and its respective region.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Aspects of the present invention provide a solution for detecting inappropriate content in a virtual world environment.

Avatars in virtual worlds can have a wide range of business and social experiences, and such experiences are becoming more important as business and social transactions are becoming common in virtual worlds, also called virtual universes, such as Second Life. In fact, the characteristics of a particular avatar may play important roles in such virtual worlds. Second Life® is a privately owned 3-D virtual world, made publicly available in 2003 by Linden Research, Inc. (commonly referred to as Linden Lab). The Second Life virtual world is computed and managed by a large array of servers that are owned and maintained by Linden Lab. The Second Life client program provides its users (referred to as residents) with tools to view, navigate, and modify the Second Life world and participate in its virtual economy. Social and business interactions are important in Second Life, and these interactions include resident interactions in both personal and business meetings.

With the growing popularity of virtual worlds and the influx of new residents of all ages and dispositions, it is important to have controls in place so as not to expose inappropriate or offensive content to juveniles or to adults who do not wish to view such content. There is a need for a system and method to identify such items and prohibit the carrying or using of such items outside of mature areas and regions.

At least one embodiment of the present invention may provide a system for identifying mature and otherwise inappropriate content and objects in a virtual world, and, more particularly, in regions or areas of a virtual world where such content is not permitted.

Another embodiment of the present invention may provide multiple methods for determining whether or not specific virtual world content and objects are appropriate in specific virtual worlds, regions, and areas.

Figure 1:
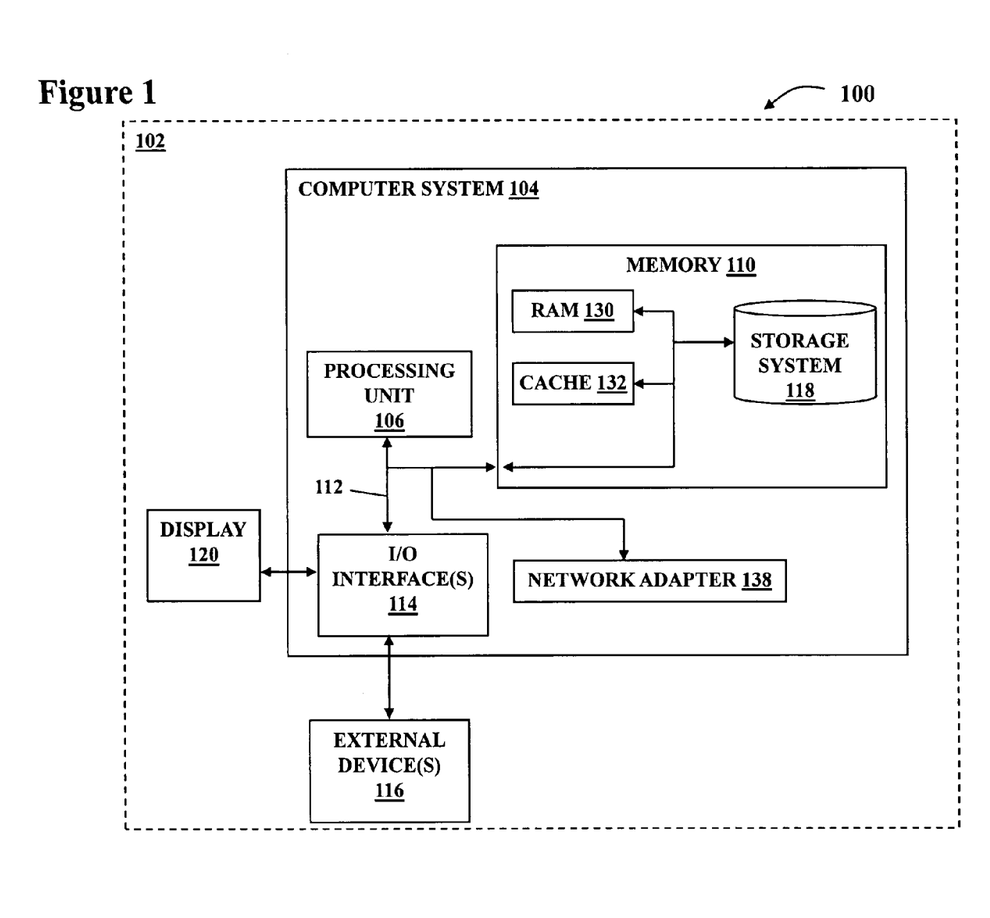
FIG. 1 shows a data processing system suitable for implementing an embodiment of the present invention.

A system for implementing the present invention, such as System 100, may have a data processing system, such as Data Processing System 102 shown in FIG. 1, suitable for storing and/or executing program code of the present invention, may include a computer system, such as Computer System 104, having at least one processing unit (Processing Unit 106) coupled directly or indirectly to memory elements (Memory 110) through a system bus, such as System Bus 112. Memory 110 may include local memory (RAM 130) employed during actual execution of the program code, bulk storage (Storage 118), and cache memories (Cache 132) that provide temporary storage of at least some program code in order to reduce the number of times code must be retrieved from Storage 118 during execution. Input/output or I/O devices (such as Display 120, and other external devices (External Devices 116), including but not limited to keyboards, pointing devices, etc.)) may be coupled to Computer System 104 either directly or through intervening I/O ports or controllers (I/O Interface(s) 114). Network adapter(s) (Network Adapter 138) may provide access to external networks.

Figure 2:
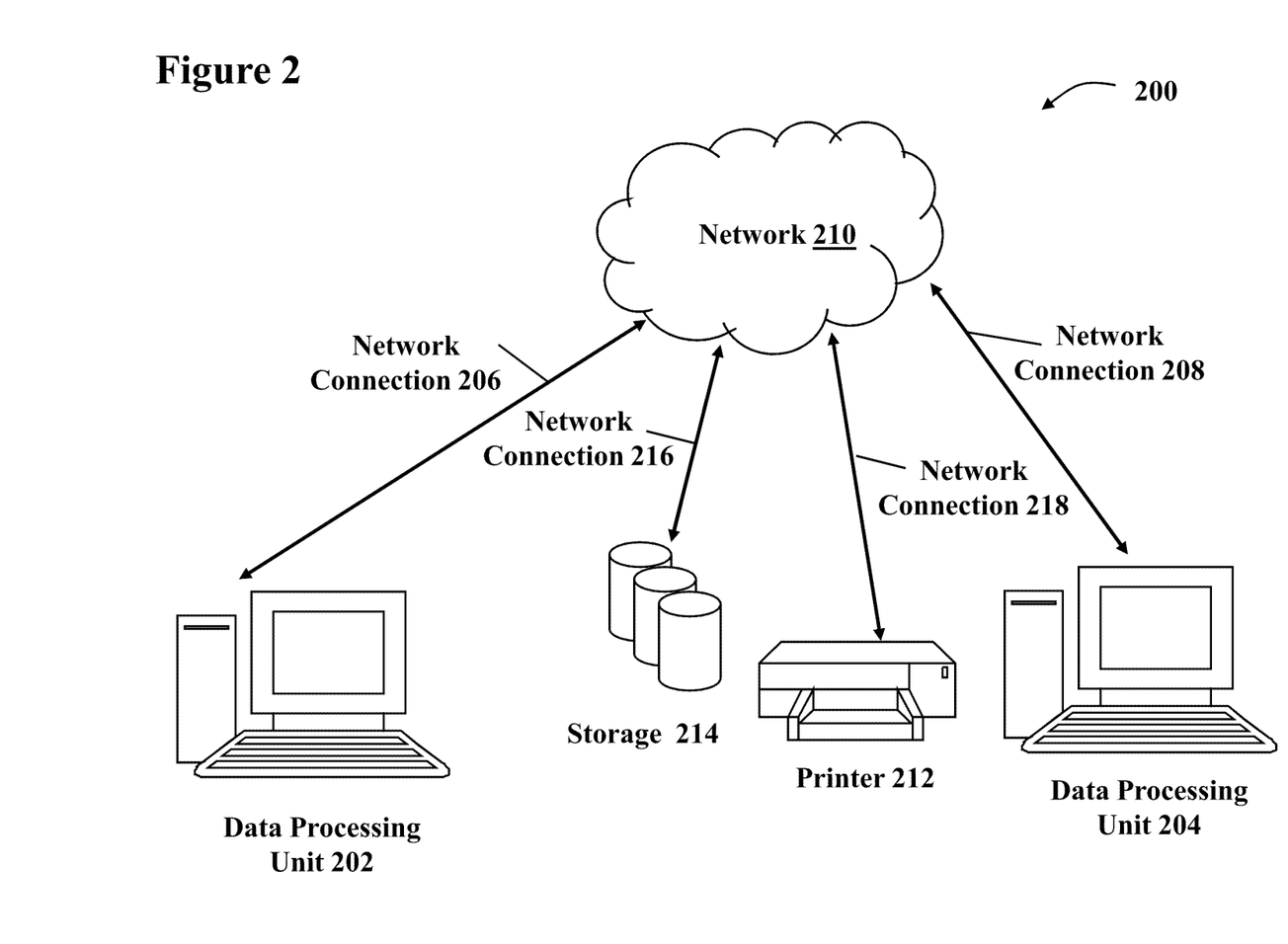
FIG. 2 shows a network for implementing an embodiment of the present invention.

FIG. 2 illustrates a networked system, such as System 200 to enable a data processing system (Data Processing Unit 202) to be coupled through network connection(s) (Network Connection 206, 208, 216, 218) to other data processing systems (Data Processing Unit 204), remote printers (Printer 212) and/or storage devices (Storage 214) through intervening private and/or public network(s) (Network 210).

Figure 3:
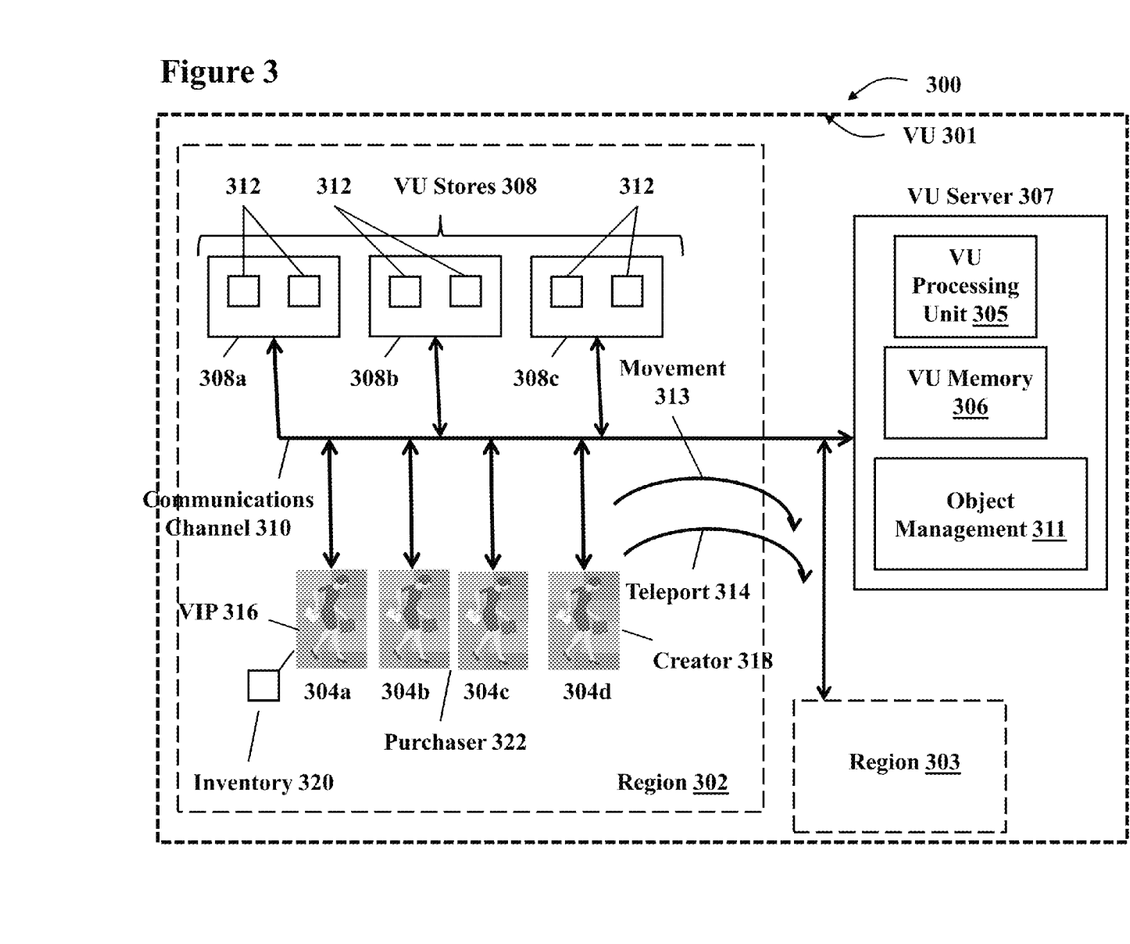
FIG. 3 illustrates an embodiment of the system of the present invention.

A system 300 for implementing the present invention is shown in FIG. 3 having a virtual universe (VU 301) that may have a VU server, such as VU Server 307. VU Server 307 may be assigned one or more regions of land within VU 301, such as Region 302 and Region 303. VU Server 307 may be assigned other regions as well.

One region, such as Region 302, may be dedicated to mature material while another region, such as Region 303, may be dedicated to neutral or family-related matter. Parents, for instance, may want to exclude their children from the mature regions, such as Region 302.

VU Server 307 may include: a VU processing unit, such as VU Processing Unit 305, for providing processing function, a VU memory, such as VU Memory 306, for storing information about VU 301 and activities and avatars within Region 302 and Region 303, and Object Management unit 311 for managing the objects within the VU. VU 301 may further have one or more avatars, such as Avatars 304a, 304b, 304c, 304d. There may be any number of avatars. The avatars may be able to communicate with one another, with VU stores, such as VU Stores 308, with VU processing unit 305 or with VU memory 306 or with other assets or objects (such as avatar attachments, vehicles, buildings, furniture, sculpture or other items) in VU 301 via a communications channel, such as Communications Channel 310. The avatars may be considered to be VU residents. Alternatively, a "resident" may be considered the human owner of the avatar. A resident may be, for instance, child or an adult.

VU Stores 308 (308a, 308b, 308c) may have Items 312 for sale to Avatars 304a, 304b, 304c, 304d. Items or Objects 312 may be real or virtual. A real item or object may be a car or a motorcycle, for example. A virtual item or object may be anything from clothing for the avatar or a dental chart of the resident. The system allows an avatar (such as Purchaser 322) to purchase a real or a virtual item or good. Purchased items may be stored in the avatar's inventory (Inventory 320).

Region 302 and Region 303 may be virtual areas of "land" within VU 301 assigned to VU Server 307. Avatars 304a, 304b, 304c, 304d may move between Regions 302, 303 as indicated by Movement arrow 313 or may teleport between Regions 302, 303 as indicated by Teleport arrow 314.

As shown in FIG. 3, VU Server 307 is assigned Region 302 and Region 303. For these assigned regions, VU Server 307 may be assigned to perform calculations for activities within these assigned regions. Activities include, but are not limited to, identifying and describing the then current geometry of the visible region for each resident or avatar, transmitting required textures for region rendering, streaming media such as music or video and transitioning residents or avatars to/from other VU servers as residents move between regions. It may also manage the movement of virtual objects and avatars in and out of its assigned regions.

As discussed, virtual worlds contain regions and areas that are specifically designed for adults who are interested in a variety of mature subject matters. In such regions, it is possible for an avatar to purchase content and objects that are only suitable for interested adults, for instance, Region 302 may be one such region, and the content and objects purchased there should not be taken into neutral or family-friendly regions and areas, such as Region 303. Such items include objects that may be morally offensive such as items of a prurient nature or those that depict gang association and the like, some may be audibly offensive such as music with explicit lyrics, while others may be visually offensive such as inappropriate clothing, appearance, gestures, and actions. At least one embodiment of the present invention may provide a system and method to identify such items and prohibit the carrying or using of such items outside of mature areas and regions.

Figure 4:
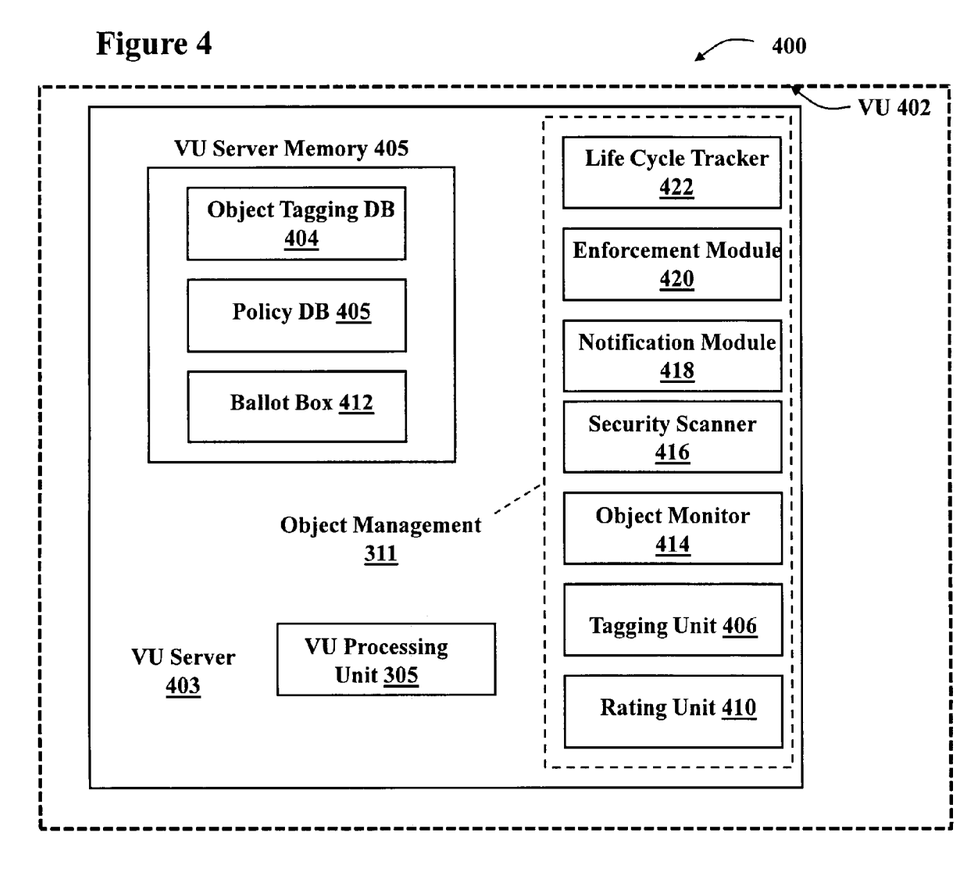
FIG. 4 illustrates an embodiment of the system of the present invention.

An embodiment of a system (System 400) of the present invention is shown in FIG. 4. System 400 has VU 402 having a VU server (VU Server 403). VU Server 403 may have VU Processing Unit 305 and VU Memory 405. VU Memory 405 may have Object Tagging Database 404 and Policy Database 405. Object Tagging Database 404 may be used by VU Server 403 to store the object tags of those objects within the VU that have been tagged. Policy Database 405 may be used by VU Server 403 to store the policy or policies to be used to tag the objects within the VU and to be used to identify prohibited actions within the VU, such as moving a mature tagged object from a mature region to a family-friendly region. A policy may be a taxonomy based policy or it may be a folksonomy based policy, for example. Folksonomy (also known as collaborative tagging, social classification, social indexing, and social tagging) is the practice and method of collaboratively creating and managing tags to annotate and categorize content. VU Memory 405 may further have a Ballot Box 412 for receiving and storing votes from avatars or residents on the ratings of objects when the policy is a folksonomy based policy.

VU Server 403 may further have Object Management 311 for managing the objects within the VU. Object Management 311 may have Rating Unit 410 for examining the objects and, using the selected policy, providing a rating to each of the objects. Example ratings are "General", "Teen" and "Adult". Object Management 311 may further have Tagging Unit 406 for tagging each object with the rating provided by Rating Unit 410. The tag for each object may be stored in Object Tagging Database 404. Object Management 311 may further have Object Monitor 414 that monitors each object within the VU to track, for example, the object's movement within the VU or within regions of the VU. VU Server 403 may further have Security Scanner 416 whose role is to scan objects at the boundaries of regions or areas within the VU. For instance, at a boundary between a family-oriented region and a mature region, the security scanner may scan objects trying to move between the two regions. If, for instance, an object having a mature rating is attempting to move from the mature region to the family-oriented region, the security scanner would scan the object, identify it as mature rated, and notify Enforcement Module 420 to prohibit the movement to the family-oriented region. Notification Module 418 may provide notice to the object owner or, e.g., the avatar that is attempting to move the object, that the movement is prohibited. Life Cycle Tracker 422 may track the life of the object so that, if there are changes to the object during its life, the object can be re-rated, if necessary. Further, the object rating may have a predetermined life span (rating life) such that Life Cycle Tracker 422 may track the rating so that the object may be re-rated at the appropriate time.

Figure 5:
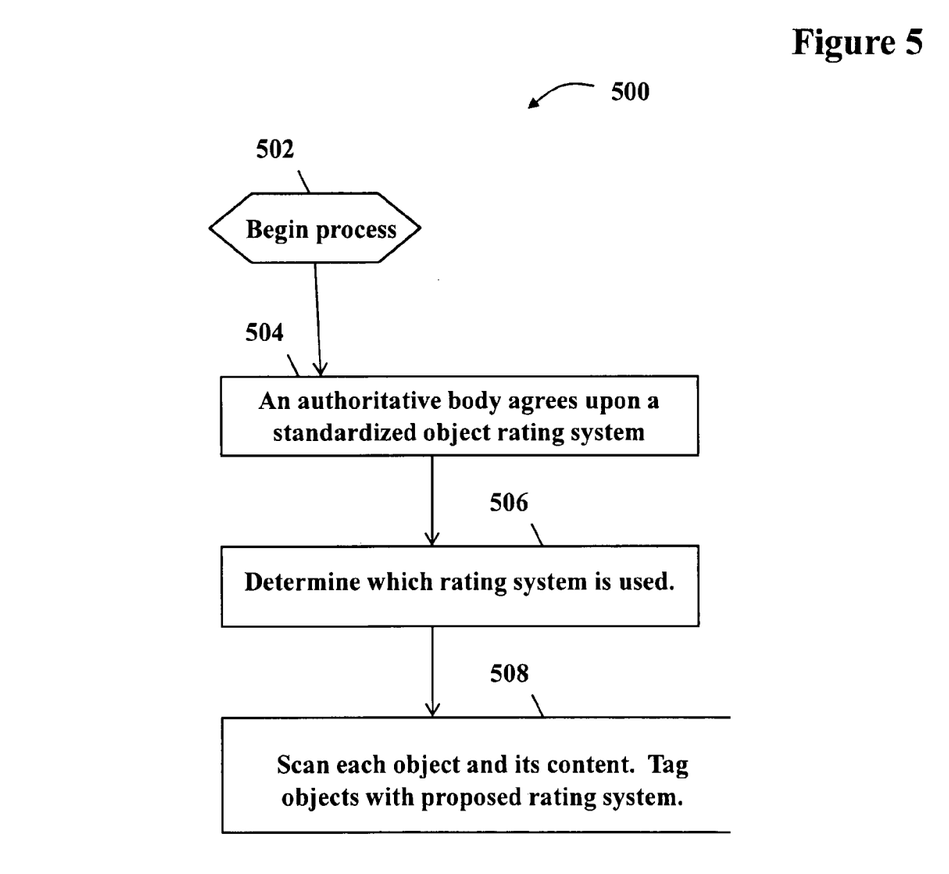
FIG. 5 illustrates an embodiment of a method of the present invention.

A first method (Method 500) as shown in FIG. 5 employed by the present invention illustrates the use of virtual object tagging for identification. A virtual object may be anything in the virtual universe. In a preferred embodiment, it begins at 502 and, at 504, an authoritative body agrees upon a standardized object rating system such that similar virtual world objects and content would carry the same rating regardless of the specific virtual environment. This would be very similar to the way that a movie ratings agency places ratings on movies, based on agreed upon standards, where, regardless of the country, state, or city, the movie ratings agency rating is the authoritative rating. Such virtual object ratings could be general in nature and cover broad categories such as "General, Teen, Adult, and Prohibited", could be more detailed and include specifics such as "Explicit Language", or could combine the two to derive ratings such as "Teen-Explicit Language". This is shown at 506. A rating of "Prohibited" may mean that the object is not permitted anywhere in the virtual world. As an example, a virtual world representing a theme park would by nature be a family friendly virtual world and would likely prohibit many items that would be permitted in certain regions or areas of virtual worlds with more diverse content.

Using this taxonomy based technique, objects and their content are scanned and are tagged at 508 with a rating according to the policy of the chosen rating system; the tag number identifies both the object and also specifies the rating of the object. In one embodiment, every object within or available throughout a virtual world may have an object rating, wherein in another embodiment, only objects of mature subject matter may carry such ratings. Additionally, the authority for a taxonomy based rating system could be an independent governing body covering all virtual environments, a body governing an individual world, or a body governing lower level regions, areas, and specific locations within an area.

Figure 6:
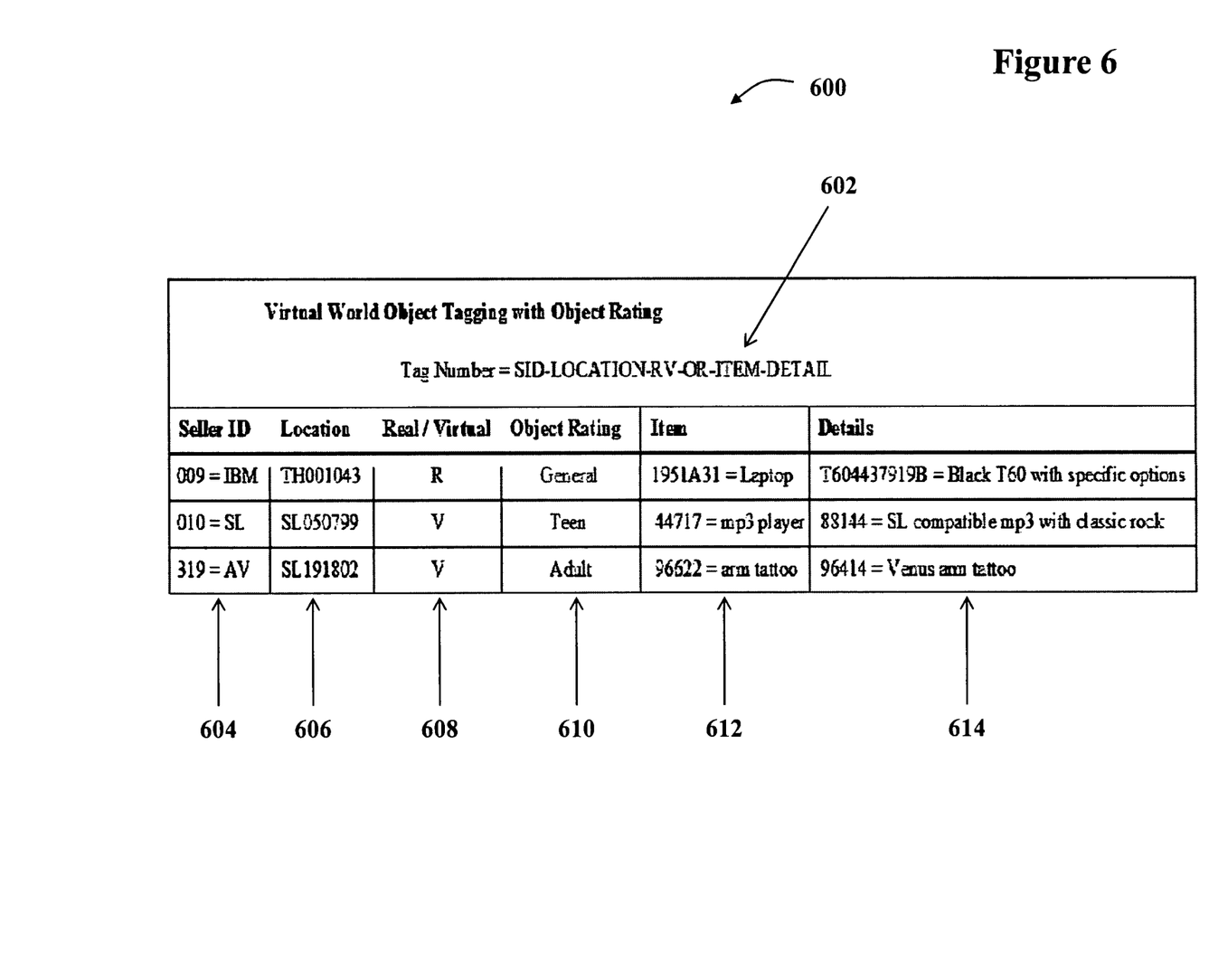
FIG. 6 is an illustrative embodiment of an object tag of the present invention.

FIG. 6 illustrates an example tag (Tag 600) that may be used to tag virtual objects. Tag 600 may have a tag number field, such as Tag Number 602, that can be used to identify the object. It may also have a seller identification (ID) field, such as Seller ID Field 604, that would identify the seller of the object. Examples are "IBM", "Second Life" and "AV". Another field may be the location field, such as Location Field 606. Location Field 606 identifies the location of the object. For instance, a virtual tree object would have a particular location within a virtual world. Real/Virtual Field 608 indicates whether the object is a real object or a virtual object. Object Rating Field 610 indicates the rating of the object. Examples are "General", "Teen" and "Adult". Item Field 612 identifies the item type. Examples are "laptop", "mp3 player" and "arm tattoo". Details Field 614 identifies the details of the object. Examples include "Black T60 with specific options", "Second Life compatible mp3 with classic rock" and "Venus arm tattoo".

Figure 8:
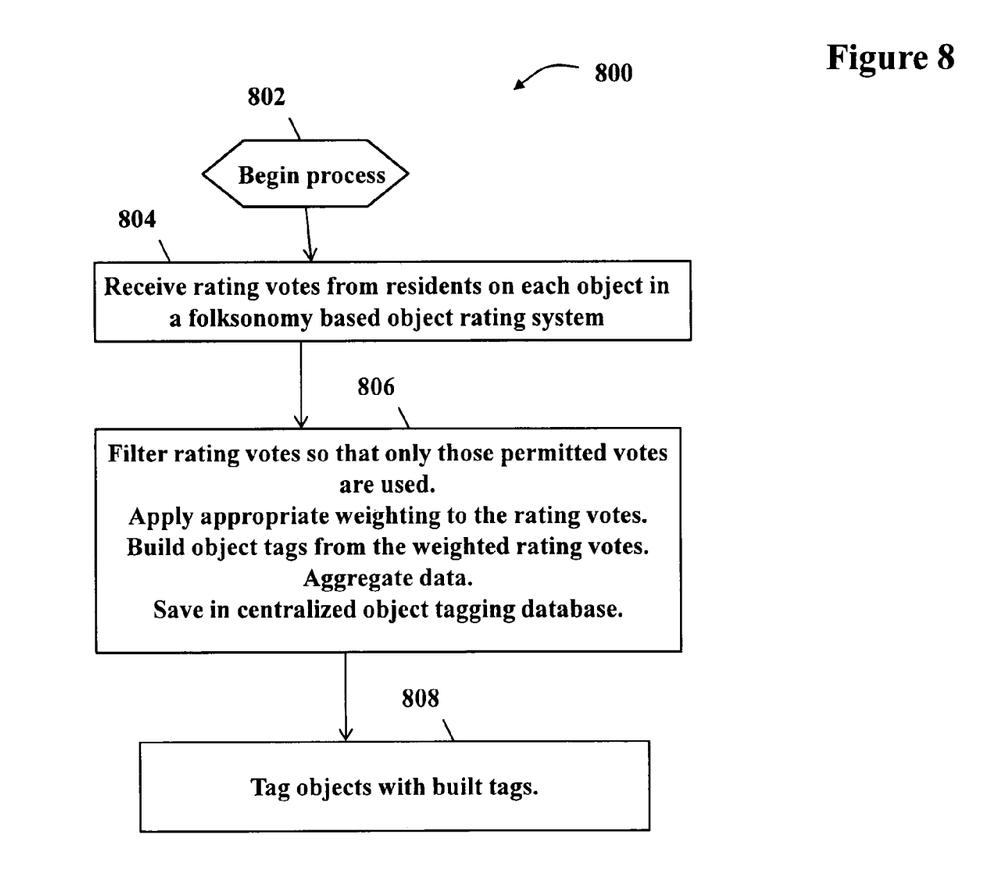
FIG. 8 is an illustrative embodiment of a method of present invention.

Such a rating system may also use an emerging technique and could be folksonomy based. FIG. 8 illustrates such a method (Method 800) that begins at 802 for use in a folksonomy based system. While tiers of authority could be identical to that described in a taxonomy based model, when applying a folksonomy based system, there is no central authority, rather, it is the community that makes decisions. With this type of system, using a preferred embodiment with a centralized object tagging database, every individual avatar may have the ability to rate an object (804), then, periodically, an aggregate data set would be used to update the relational database (e.g., Object Tagging Database 404) with the latest rating consensus for a given object or content at 806. In one embodiment, every avatar in a given virtual world or region may have the ability to rate objects and content using Rating Unit 410. In another embodiment, only members (e.g., Avatars 304b, 304c), or VIP members (e.g., VIP 316) of a virtual environment (e.g., VU 301) would be jointly authoritative and non-members would have no rating authority. In yet another embodiment, all residents could vote, but the members' and VIP member's votes may carry more weight. The objects are then tagged with the ratings at 808.

In either the case of a taxonomy or folksonomy based rating system, the initial rating of an object must be established. In one embodiment, this initial rating is assigned by the creator or introducer of an object. Using a taxonomy based model, the creator (e.g., Creator 318) should adhere to the established standards, whereas, one could use subjective judgment in rating an object or content in a folksonomy based system. In a similar embodiment, the purchaser or owner, rather than the creator of an object, would be able to set a new initial rating.

A hybrid embodiment of this invention using a tagging based implementation might use a combination of methods whereby agreed upon objective taxonomy based ratings may be used for a given set of objects and content, while other more subjective objects and content may be rated using a folksonomy based system.

Using any of these tagging methods, individually or jointly, an avatar's inventory (e.g., Inventory 320) and appearance could be scanned for tags at key moments in time such as at log-in time, when rendering a new appearance, while passing between regional boundaries, prior to or after teleportation, and when buying, selling, or trading objects or content. Based on the results of such scans, an avatar may be denied access or face other penalties. The following methods may be used in a tagging system:

Objects may be tagged by value, class, or rating (based on context) determined by location of the object's initial acquisition. For example, an object purchased (obtained) in a virtual candy store might have a rating more generally acceptable whereas an object purchased in an adult novelty store would be rated as more restrictive. The object classification/rating could be sticky and follow the object through its normal life-cycle. The object classification/rating may control inclusion into new sources of acquisition, for example, re-marketing the object in a new venue.

Object classification/rating could be tracked and modified through the object's life cycle. An object's rating and value may change through the object's life cycle. For example, material that was once restricted may be downgraded to a lower restriction level. Also, by tracking the history of an object's classification/rating, initial acquisition point, security, marketing, usage patterns, and other demographics could be recorded and aggregated. An analogy would be a gun used in crime, where the gun is tagged with its history including the initial acquisition point. Also, by tracking history, marketing and other information could be aggregated such as objects of class X have and n % chance of ending up in locations of class Y.

Patterns of movements of sensitive objects, both into and out of authorized locations as well as attempts to enter unauthorized locations, could be determined through statistical means. Alarms could be produced when specific patterns achieve a high level of confidence. An example might be when a particular avatar's ID object attempts to gain entrance to an unauthorized location within a given frequency/time pattern, or when this pattern changes abruptly. Object classification/rating may need privacy components to protect users while giving access of aggregated patterns to interested parties. Patterns of movements may be used for a number of purposes including security monitoring (determining security threats), value changes for object classes, and touch points of object classes. These patterns may be used by object developers to improve designs.

Object classification and rating may be structured in a hierarchy with common characteristics for each level in the hierarchy. For example, media sources (video, magazines, CD's, etc.) may be classified or rated by level of acceptability based on age, as mentioned before where General, Teen, and Adult would be different levels. The hierarchy provides a structured relationship between levels and the ability to group objects and location access permission by level and adjust level ratings in a relative fashion.

Another embodiment of the present invention may utilize public voting to establish or modify class or rating of objects. It allows that ratings can be automatically modified based on popular use. For example, Victorian values are mostly obsolete today, not by legislation or planning, but by popular convention. Adjustments to ratings may be made based on similar popular use/convention for object classes or the relative shifting of levels. (This is shown in FIG. 8.)

Another embodiment could use speaker identification (SIV) to verify identify of object recipient. Voice identification detection is a simple means of identification for fully interactive 3-D virtual environments. Speech processed in the background and identify determined and verified. Identity check established and permission determined as part of object acquisition.

In additional to tagging based methods, the invention may optionally deploy optical character recognition technology (OCR). OCR technology is capable of interpreting both hand written and type set text images. Using OCR, any documents or objects containing text could be scanned and reviewed for keywords that indicate prohibited content or objects. The present invention could use OCR independently, or in conjunction with the other methods described.

The present invention may utilize media scanning techniques for scanning, extracting, and evaluating text, visual images, and audio stored in all current media formats. All inventory carried by an avatar, and the image of the avatar itself, could be scanned and analyzed. Keywords and key shapes could be used to determine undesirable objects and content.

A virtual security scanner (416) could be located at a location entrance, akin to the security scanners in the airport. An avatar seeking entrance to a location would pass through the scanner and any unauthorized objects would be detected. Additionally, in one embodiment, there may be a feature wherein an authority avatar (or person) could register to be alarmed if another avatar attempted acquire a restricted object or to transport a restricted object into a restricted area. An example would be a parent tracking a child who attempts to purchase adult material would be notified of the acquisition attempt.

Figure 7:
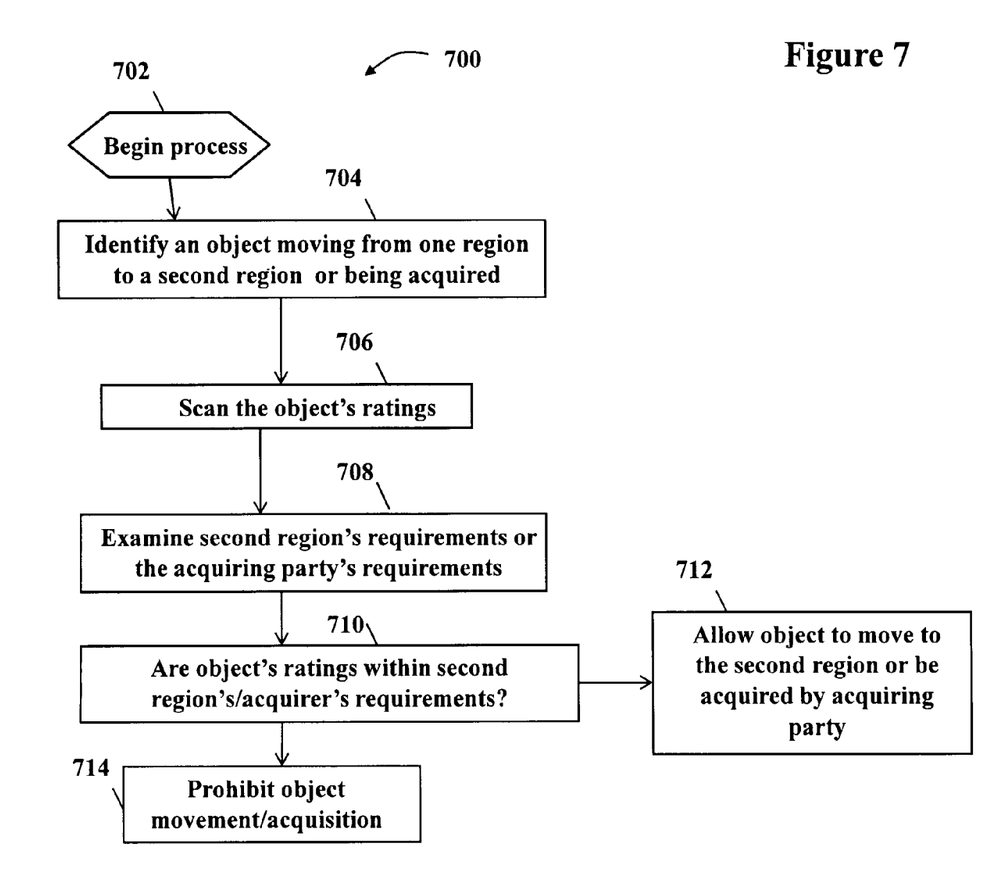
FIG. 7 is an illustrative embodiment of a method of present invention.

FIG. 7 illustrates such a method, Method 700, that begins at 702. At 704, the object monitor identifies an object moving from one region to a second region or an attempt to acquired an object. At 706, the scanner scans the object's ratings and, at 708, the system examines the second region's or the acquiring party's requirements. At 710, it is determined whether the object's ratings are within the second region's/acquirer's requirements and, if so, allows the object to move to the second region or be acquired by acquirer at 712. If not, at 714, the object's movement/acquisition is prohibited.

In many cases, it is very clear that an avatar is in violation of a regional policy with respect to inventory content or visual imagery. As an example, if vulgar language is prohibited, it is very easy to establish rules and keywords to identify such vulgar language and to take action when discovered. Searching inventory for offensive objects, however, can be more difficult. The present invention may supplement the automated search functions already discussed with a notification mechanism, such as Notification Module 418. With Notification Module 418, when a potentially offensive object is identified, a regional authority may be notified and could then choose to review the identified item. Upon identification of any new form of offensive object, keywords and shapes would be updated such that future occurrences of the same item or item type would be discovered through the automated processes.

In a preferred embodiment, an enforcement module, such as Enforcement Module 420, may be a rules based system whereby a violation of a specific rule would have an associated action. As an example, one rule could state that a first use of prohibited language would cause a message to be sent to the offending avatar warning them of the consequences of further offenses. An associated rule could be that a second violation of the language rules by the same avatar would cause the avatar to be logged-out of the virtual environment. Additionally, there may be soft rules that would not have a specific action associated, rather, Notification Module 420 would be used and a representative of the regional authority could decide what, if any, action to take.

In yet another embodiment, the rating system may be valid between virtual worlds. That is to say, that an object rating obtained in one virtual world would be understood in another virtual world. There may be limited compatibility standards between virtual worlds, so such an implementation may require an API or service. Finally, in one embodiment a rating and scanning fee could be charged to bring inventory items from one virtual world into another virtual world.

Through the use of the present invention, virtual environments can be used by all types of people and associated avatars while keeping unwanted content out of specified worlds, regions, and areas.

It should be understood that the present invention is typically computer-implemented via hardware and/or software. As such, and client systems and/or servers will include computerized components as known in the art. Such components typically include (among others), a processing unit, a memory, a bus, input/output (I/O) interfaces, external devices, etc.

While shown and described herein as a system and method for detecting inappropriate content in virtual worlds, it is understood that the invention further provides various alternative embodiments. For example, in one embodiment, the invention provides a computer-readable/useable medium that includes computer program code to provide a solution for tagging an object so that it can be found in a search. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for detecting inappropriate content in virtual worlds or in regions of virtual worlds, or virtual universes. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

In another embodiment, the invention provides a business method that performs the process steps of the invention on a subscription, advertising, and/or fee basis. That is, a service provider, such as a solution integrator, could offer to provide a solution for tagging and externalizing the tag for a real or virtual object in a virtual world. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for identifying virtual objects having inappropriate content in a virtual universe (VU) having one or more regions, the VU having virtual objects, each of the virtual objects having content, the method comprising:
    rating each virtual object based upon an appropriateness of its content for each of a set of avatars within the VU, the appropriateness based upon at least one of: a sexual nature of the content, a morally offensive nature of the content, and a socially offensive nature of the content, wherein each of the virtual objects comprises at least one of the following: a virtual object purchasable by an avatar, and a virtual object stored in an inventory of an avatar, and wherein the rating for each virtual object is generated upon initial creation of each virtual object;
    tagging each virtual object with its rating;
    receiving a plurality of ratings for each virtual object from the set of avatars within the VU;
    tagging each virtual object with an updated rating;
    storing each virtual object rating in an object tagging database;
    storing policies associated with the ratings and the regions in a policy database;
    monitoring movement of a location of each virtual object within the VU;
    scanning the inventory of the avatar to determine each virtual object rating, wherein the scanning of the inventory occurs when the avatar moves from one region to another region of the one or more regions; and
    enforcing the policies of the policy database based upon the rating of each virtual object and its respective region.

2. The method as defined in claim 1 further comprising selecting a rating system.

3. The method as defined in claim 2 further comprising selecting a taxonomy based rating system.

4. The method as defined in claim 2 further comprising selecting a folksonomy based rating system.

5. The method as defined in claim 1 wherein the set of avatars comprises members and non-members, the method further comprising allowing the members to rate each virtual object and prohibiting the non-members to rate each virtual object.

6. The method as defined in claim 1 wherein the set of avatars comprises members and non-members, the method further comprising weighting the ratings from the members more heavily than the ratings from the non-members.

7. The method as defined in claim 1 further comprising scanning each virtual object when each virtual object moves from a first region to a second region.

8. The method as defined in claim 7 wherein the virtual universe has at least one mature region having one or more mature objects and at least one family-oriented region, the method further comprising prohibiting movement of the one or more mature objects from the mature region to the family-oriented region.

9. The method as defined in claim 1 wherein each virtual object is acquired in a location, the method further comprising tagging the one or more virtual objects based on the location.

10. The method as defined in claim 1 wherein each virtual object has a life cycle, the method further comprising tracking each virtual object through the respective life cycles of each virtual object.

11. A system for identifying virtual objects having inappropriate content in a virtual universe (VU), the VU having virtual objects, the VU further having one or more regions, the system comprising:
 a VU processing unit;
 a memory unit operably associated with the VU processing unit;
 an object management tool storable in the memory unit and executable by the VU processing unit, the object management tool comprising:
  a rating unit configured for rating each of the one or more virtual objects based upon an appropriateness of its content for each of a set of avatars within the VU, the appropriateness based upon at least one of: a sexual nature of the content, a morally offensive nature of the content, and a socially offensive nature of the content, wherein each of the one or more virtual objects comprises at least one of the following: a virtual object purchasable by an avatar, and a virtual object stored in an inventory of an avatar, and wherein the rating for each of the one or more virtual objects is generated upon initial creation of each of the one or more virtual objects;
  a tagging unit configured for:
   tagging each of the one or more virtual objects with its respective rating;
   receiving a plurality of ratings for each of the one or more virtual objects from the set of avatars within the VU; and
   tagging each of the one or more virtual objects with an updated rating;
  an object tagging database configured for storing ratings of the one or more virtual objects;
  a policy database configured for storing policies associated with the ratings and the regions;
  an object monitor configured for monitoring movement of a location of each virtual object within the VU;
  a security scanner configured for scanning the inventory of the avatar to determine each virtual object rating of each of the one or more virtual objects, wherein the scanning of the inventory occurs when the avatar moves from one region to another region of the one or more regions; and
  an enforcement module configured to enforce the policies of the policy database based upon the rating of each virtual object and its respective region.

12. The system as defined in claim 11, the object management tool further comprising a notification module configured to provide notification if the one or more virtual objects violate the policies.

13. The system as defined in claim 12, wherein each of the one or more virtual objects has a rating life, the object management tool further comprising a life cycle tracker configured for tracking the rating life of each of the one or more virtual objects.

14. The system as defined in claim 13, wherein the virtual universe further has one or more avatars, the system further comprising a ballot box configured for receiving rating votes on the one or more virtual objects from the one or more avatars based upon the content of the one or more virtual objects.

15. A non-transitory computer-readable storage device storing computer instructions, which when executed, enables a system comprising a processing unit, a memory, a bus, and one or more input/output (I/O) interfaces to implement a method for identifying virtual objects having inappropriate content in a virtual universe (VU) having one or more regions, the VU having virtual objects, each of the virtual objects having content, the computer instructions comprising:
 rating each virtual object based upon an appropriateness of its content for each of a set of avatars within the VU, the appropriateness based upon at least one of: a sexual nature of the content, a morally offensive nature of the content, and a socially offensive nature of the content, wherein each of the virtual objects comprises at least one of the following: a virtual object purchasable by an avatar, and a virtual object stored in an inventory of an avatar, and wherein the rating for each virtual object is generated upon initial creation of each virtual object;
 tagging each virtual object with its rating;
 receiving a plurality of ratings for each virtual object from the set of avatars within the VU;
 tagging each virtual object with an updated rating;
 storing each virtual object rating in an object tagging database;
 storing policies associated with the ratings and the regions in a policy database;
 monitoring movement of a location of each virtual object within the VU;
 scanning the inventory of the avatar to determine each virtual object rating, wherein the scanning of the inventory occurs when the avatar moves from one region to another region of the one or more regions; and
 enforcing the policies of the policy database based upon the rating of each virtual object and its respective region.

16. The non-transitory computer-readable storage device as defined in claim 15 wherein the computer instructions further comprise using a taxonomy based rating system.

17. The non-transitory computer-readable storage device as defined in claim 15 wherein the computer instructions further comprise using a folksonomy based rating system.

18. The non-transitory computer-readable storage device as defined in claim 17 wherein the computer instructions further comprise receiving one or more rating votes on each of the virtual objects from the set of avatars, aggregating the one or more rating votes and storing the aggregated rating votes in the object tagging database.

19. The non-transitory computer-readable storage device as defined in claim 18 wherein the set of avatars comprises members and non-members, wherein the computer instructions further comprise allowing the members to rate the one or more virtual objects and prohibiting the non-members to rate the one or more virtual objects.

20. A method for deploying a computing infrastructure, comprising integrating computer-readable code into a computing system, wherein the code in combination with the computing system is capable of performing a process for identifying virtual objects having inappropriate content in a virtual universe (VU) having one or more regions, the VU having virtual objects, each of the virtual objects having content, the process comprising:

rating each virtual object based upon an appropriateness of its content for each of a set of avatars within the VU, the appropriateness based upon at least one of: a sexual nature of the content, a morally offensive nature of the content, and a socially offensive nature of the content, wherein each of the virtual objects comprises at least one of the following: a virtual object purchasable by an avatar, and a virtual object stored in an inventory of an avatar, and wherein the rating for each virtual object is generated upon initial creation of each virtual object;

tagging each virtual object with its rating;

receiving a plurality of ratings for each virtual object from the set of avatars within the VU;

tagging each virtual object with an updated rating;

storing each virtual object rating in an object tagging database;

storing policies associated with the ratings and the regions in a policy database;

monitoring movement of a location of each virtual object within the VU;

scanning the inventory of the avatar to determine each virtual object rating, wherein the scanning of the inventory occurs when the avatar moves from one region to another region of the one or more regions; and enforcing the policies of the policy database based upon the rating of each virtual object and its respective region.

\* \* \* \* \*